O. E. HUNT.
MOTOR VEHICLE.
APPLICATION FILED MAR. 1, 1911.

1,187,736. Patented June 20, 1916.

Witnesses

Inventor
Ormond E. Hunt,
by
Attorney

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,187,736.

Specification of Letters Patent. Patented June 20, 1916.

Application filed March 1, 1911. Serial No. 611,678.

*To all whom it may concern:*

Be it known that I, ORMOND E. HUNT, a citizen of the United States, and resident of Detroit, Wayne county, State of Michigan, have invented certain new and useful Improvements in Motor-Vehicles, of which the following is a specification.

This invention relates to motor vehicles and particularly to the construction and arrangement of the frame, the body, the fuel tank, and the spare tire supports.

An object of the invention is to make a simple and comprehensive arrangement of these parts. It is particularly desired to so arrange the fuel tank and the spare tires at the rear of the vehicle that the tank will be firmly supported and conveniently located and that the spare tires may be supported wholly from the frame thereby relieving the body of any of the work of holding the tires while at the same time the tires are in an accessible position.

Other objects of the invention will appear from the following description and claims.

Figure 1:
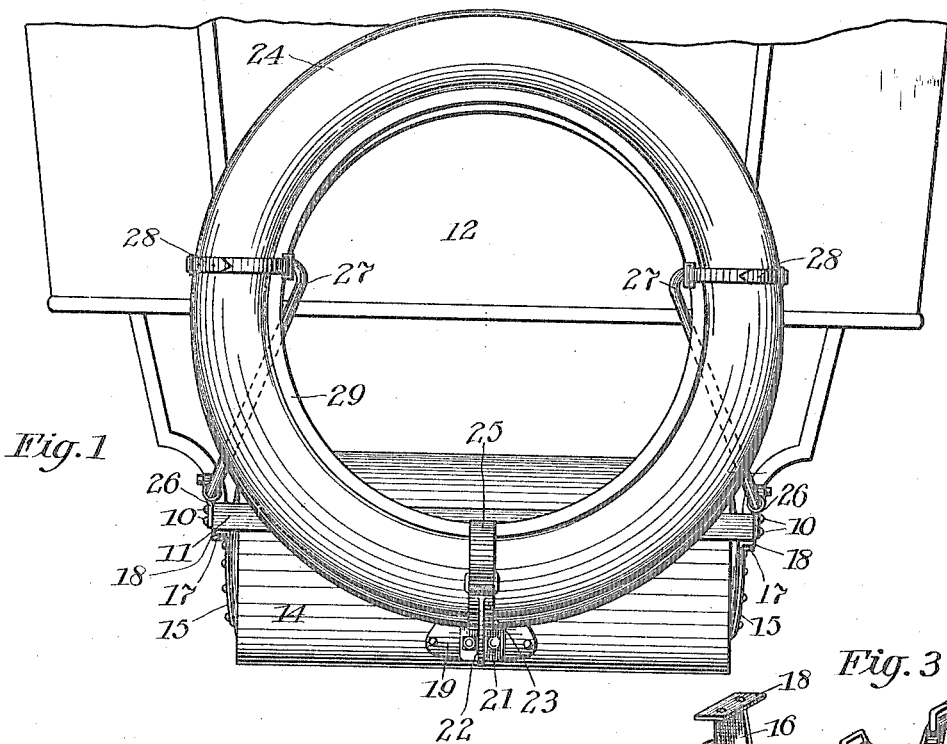
Figure 3:
Figure 2:
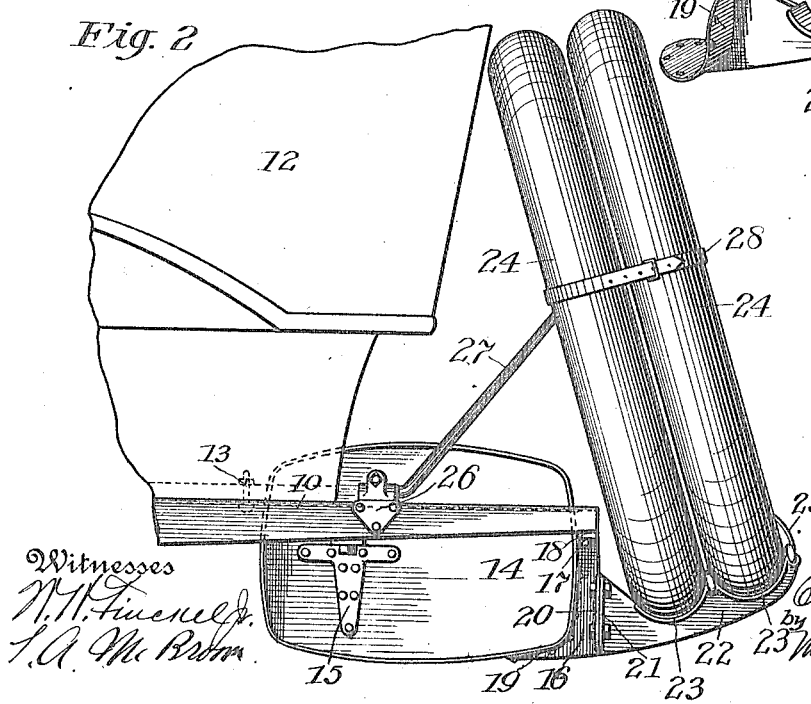

In the drawings, Figure 1 is a rear view of a motor vehicle embodying this invention with parts of the body cut away and with the running gear omitted; Fig. 2 is a side elevation of what is shown in Fig. 1; and Fig. 3 is a detail view.

The drawings illustrate the rear portion of a motor vehicle frame comprising side members 10 and a cross or end member 11 joining the rear ends of the side members. The vehicle body 12 is preferably detachably supported on the frame, being secured thereto as by bolts 13. The side frame members 10 extend somewhat beyond the rear of the body 12, as shown particularly in Fig. 2, and in the rectangular space thus formed between the side members and the body and the rear member the fuel tank 14 is arranged. This tank is supported from the frame by side brackets 15 properly secured to the frame and to the tank as shown. It is also supported from the rear member 11 by a bracket 16 secured to the member 11 by bolts 17 passing through the flange 18 on the bracket. This bracket has a broad plate portion 19 which extends down partly around the bottom of the tank and is secured thereto by rivets, as shown. Thus the tank 14 is wholly supported from the frame by the three brackets described.

In Fig. 2 the bracket 16 is shown as provided with a flange 20 to which is secured the flange 21 of a supporting arm 22 extending rearwardly and formed with a pair of concave seats or recesses 23 adapted to support one or two vehicle tires. A pair of tires 24 are shown secured in these recesses by the strap 25.

Mounted in suitable brackets 26 on the side members 10 are a pair of arms 27 extending diagonally upward from said frame to a position adjacent the tires 24, and these arms are adapted to be secured to the tires by straps 28 so as to brace the tires in the approximately upright position in which they are shown. It will be noted that the upper part of the inside tire extends close to, but not in contact with, the rear portion of the body 12, the brace arms 27 preventing the tires from coming in contact with the body. It will be understood that these tires as used on modern motor vehicles, are extremely heavy, particularly when mounted on detachable rims 29, as shown in Fig. 1, and for this reason it is advisable that they be supported entirely from the frame and out of contact with the body, thus taking the strain incident to carrying the tires from the body and placing it on the frame, which may be built strong enough to hold them. In the claims the term "tires" includes either the tires alone or as mounted upon the rims 29 above referred to. In Fig. 2 the supporting arm 22 is shown as detachable from the bracket 16, whereas in Fig. 3 another form is shown in which the supporting arm 22 and the bracket 16 are integral.

Having thus described my invention, what I claim is:—

1. In a motor vehicle, the combination with the frame, and the body supported thereon, of a bracket mounted on the frame and adapted to support a vehicle tire in substantially upright position adjacent said body, and a pair of arms mounted on said frame independently of the bracket connection therewith and adapted to brace said tire in said position.

2. In a motor vehicle, the combination with the frame comprising side members and an end member and the body supported thereon, of a bracket mounted on the end member and adapted to support a vehicle tire in upright position with the top of said tire adjacent said body, a pair of arms mounted on the side members and extending diagonally upward therefrom to a position favorable for bracing said tire in said upright position, and straps to secure said tire to said bracket and arms.

3. In a motor vehicle, the combination with the frame thereof, of a fuel tank, a bracket mounted on the frame and connected to the tank, and arms on said bracket and said frame to support a vehicle tire adjacent to but out of contact with said fuel tank.

4. In a motor vehicle, the combination with the frame thereof, of a fuel tank, a bracket mounted on the frame and connected to the tank, and a projecting arm on said bracket and adapted to support a vehicle tire.

5. An article of manufacture comprising a bracket having a flange for attachment to a support, a plate portion for attachment to a tank, and an arm having recesses for supporting one or more vehicle tires.

6. In a motor vehicle the combination with a frame, of a mounting thereon for supporting a tank, said mounting having a rearward extension forming a bracket, and a tire carrier secured to said bracket.

7. In a motor vehicle, the combination with the frame, and the body supported thereon, of a bracket mounted on the frame and adapted to support a vehicle tire in substantially upright position adjacent said body, and a pair of arms independent of the bracket mounted on the frame independently of the body and adapted to brace said tire in said position.

8. In a motor vehicle the combination with the frame and the body supported thereon, of a tire bracket mounted on the frame, and a pair of upwardly extending arms connected to the frame independently of the body, said bracket and arms being arranged to support and brace a tire in an upright position adjacent said body.

9. In a motor vehicle, the combination with the frame, and the body supported thereon, of a tire bracket mounted on the frame and extending therefrom in position to receive a tire, and a pair of upwardly extending arms connected to the frame independently of the body and having parts adapted to receive the tire rim, said brackets and arms being arranged to support and brace said tire in upright position adjacent said body.

10. In a motor vehicle, the combination with a frame comprising side members and an end member, and a body supported on the frame, of a bracket mounted on the end member and extending outwardly therefrom in position to receive a vehicle tire, a pair of arms independent of the body extending from the side members diagonally upward to a position to receive the rim of said tire, said bracket and arms being adapted to support and brace said tire in upright position with the top of the tire adjacent said body, and means for securing the tire.

In testimony whereof I affix my signature in the presence of two witnesses.

ORMOND E. HUNT.

Witnesses:
W. H. FINCKELL, Jr.,
L. A. McBROOM.